G. F. COOKE.
LAND CULTIVATION APPARATUS.
APPLICATION FILED SEPT. 4, 1918.

1,323,017.

Patented Nov. 25, 1919.
4 SHEETS—SHEET 1.

Witnesses.
J. K. Moore
R. E. Barry

Inventor.
George F. Cooke
By Whitaker Prevost
attys

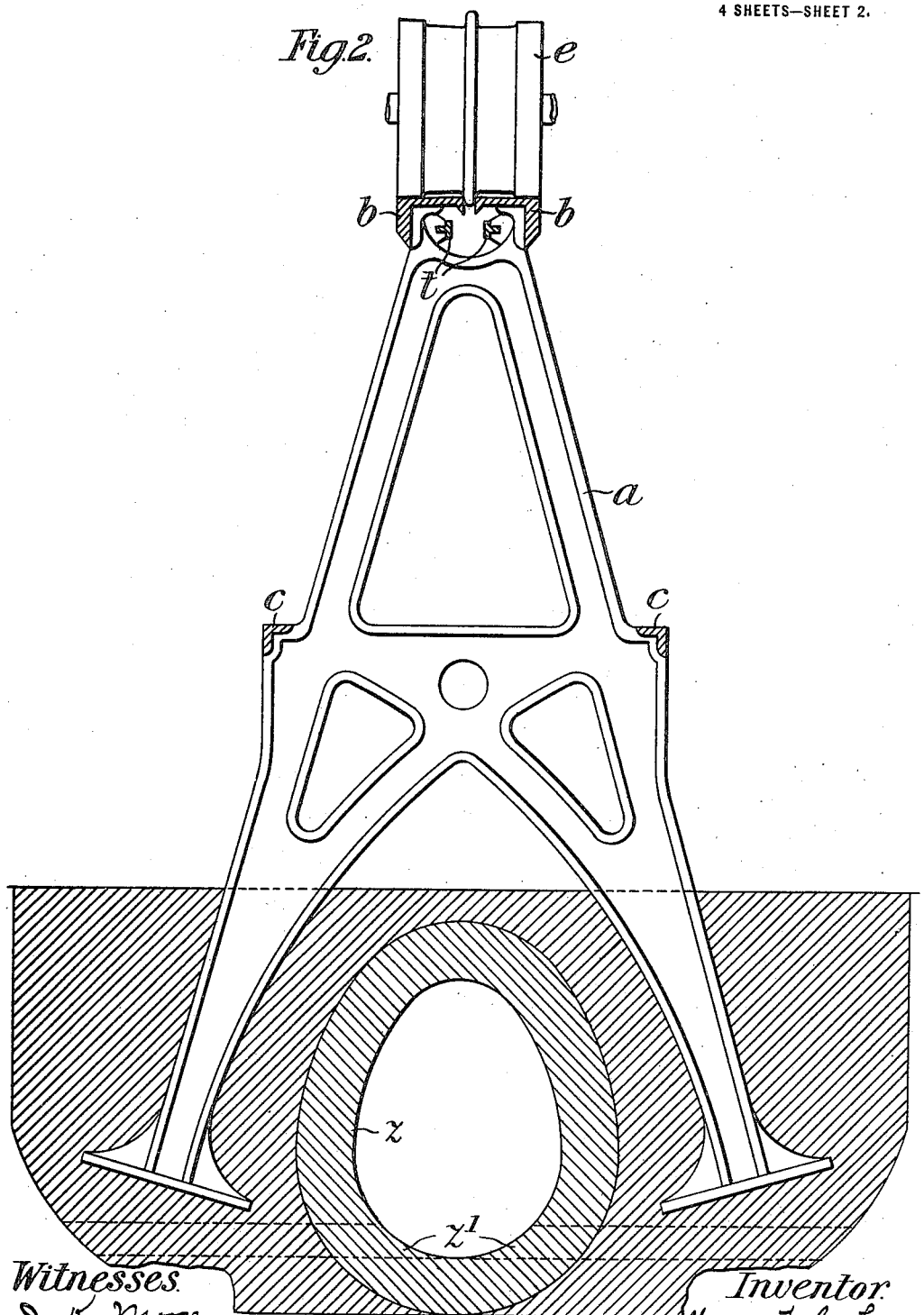

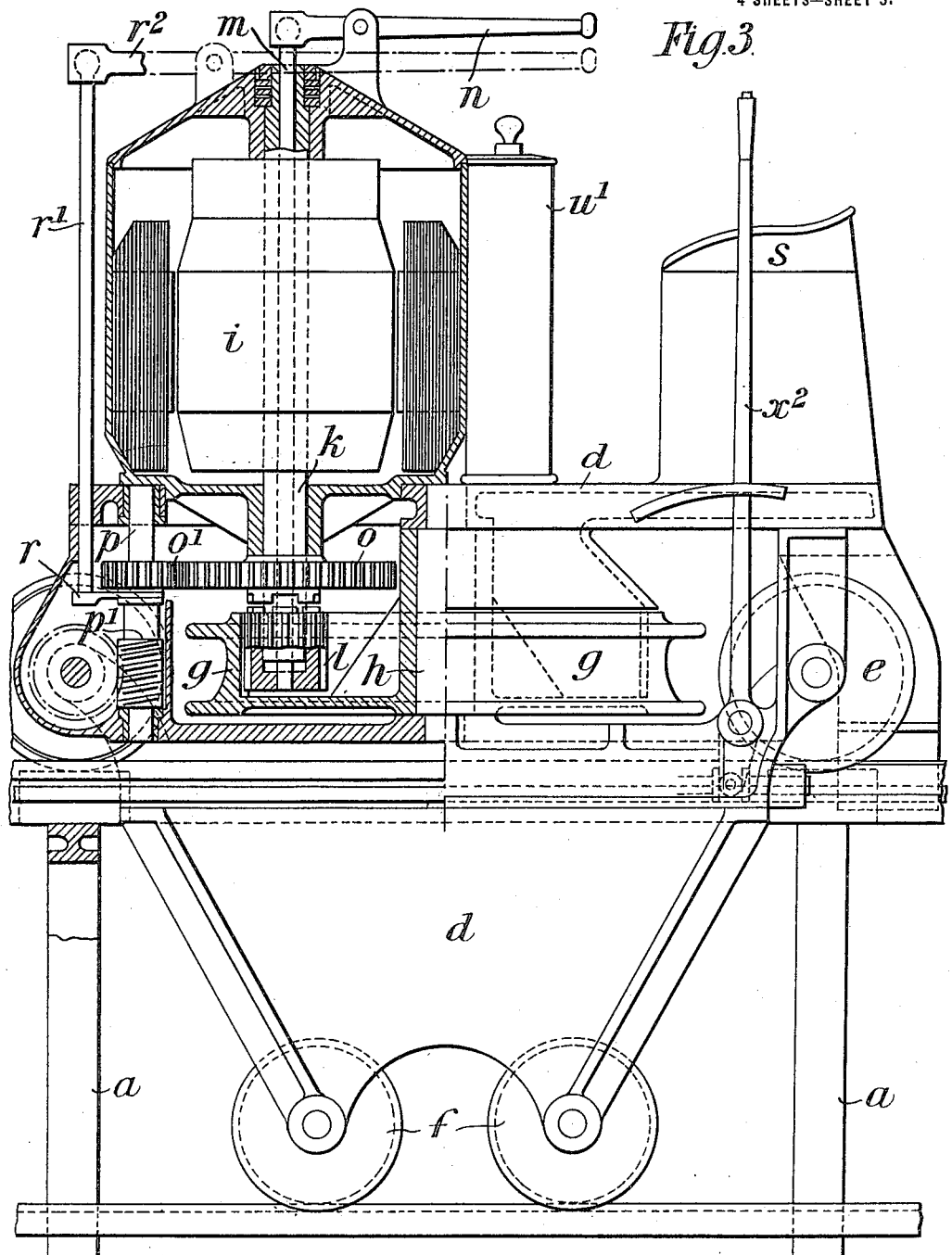

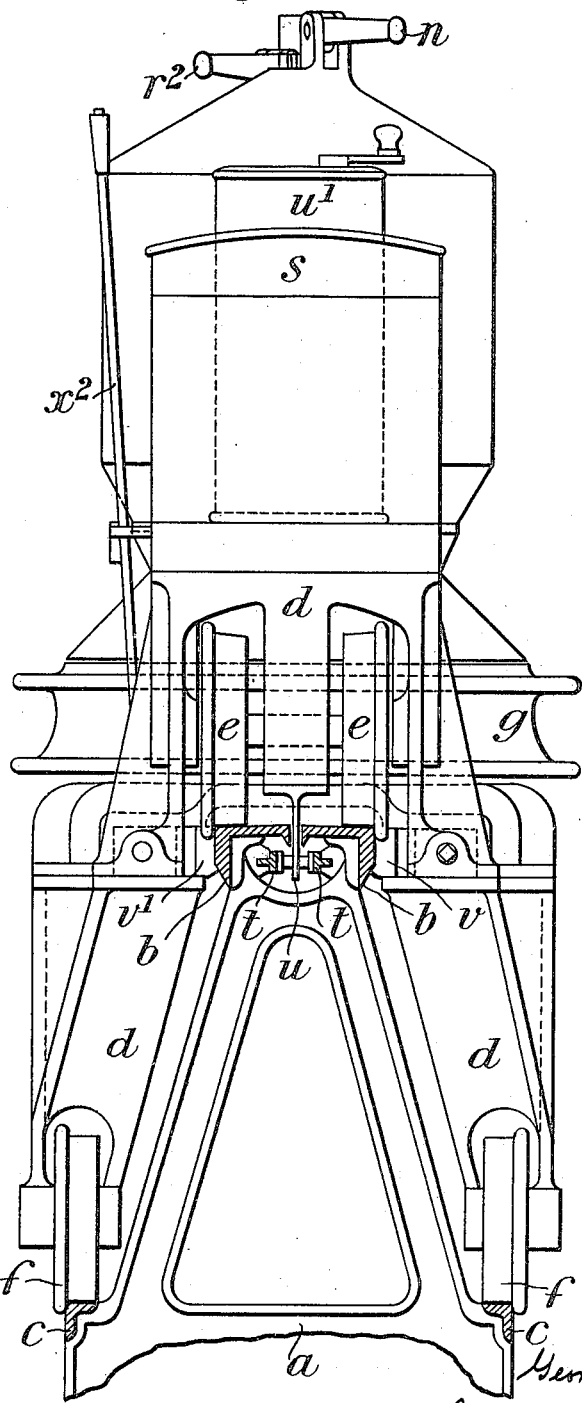

UNITED STATES PATENT OFFICE.

GEORGE FREDERICK COOKE, OF LONDON, ENGLAND.

LAND-CULTIVATION APPARATUS.

1,323,017.      Specification of Letters Patent.      Patented Nov. 25, 1919.

Application filed September 4, 1918. Serial No. 252,578.

*To all whom it may concern:*

Be it known that I, GEORGE FREDERICK COOKE, a subject of the King of Great Britain, residing at 2 Fairfax road, Bedford Park, London, England, have invented a new and useful Improved Land-Cultivation Apparatus, of which the following is a specification.

My invention relates to an improved system for operating tilling and other agricultural implements by mechanical power, the invention being especially applicable for cultivating large areas devoid of hedges, ditches and other obstructions.

According to my invention I dispense with the use of mechanical tractors or engines designed to run upon the soil, or upon a temporary track laid thereon, and employ elevated rail tracks permanently erected parallel to one another on opposite sides of the area to be cultivated and each designed to carry a traveling motor for operating a wire rope or cable for hauling the implements. These motors are each provided with a winding drum, but instead of such drums being each provided with an independent rope as is now the usual custom I make use of a single rope which is of slightly greater length than twice the distance between the elevated tracks, the two ends of the said rope being connected to the implement to be operated, while the rope itself is coiled, say, two and a half times around the winding drum of each motor, the said winding drums acting in the same way as capstan heads for causing the travel of the rope.

In carrying out my invention I advantageously make use of electricity as the motive power.

My invention will be readily understood by reference to the accompanying drawings, in which:—

Fig. 2 is a sectional elevation illustrating the arrangement of the supports of the rail track.

Fig. 3 is a sectional side view of a traveler designed to run upon the track; and Fig. 4 is an end view of the same.

$a$, $a$ indicate the standards or supports for carrying the elevated track, the said supports being advantageously made of A-shape provided at their lower extremities with feet, which supports are buried at their lower ends directly in the ground or, where necessary, fixed upon concrete foundations. These supports $a$, $a$ which in practice project, say, four feet above the ground, carry angular rails $b$, $b$ at the upper part and steadying rails $c$, $c$ at a lower level, and the traveler frame $d$, which is in the form of a saddle, is provided with traveling wheels $e$, $e$ which run upon the upper rails $b$, $b$ and with other wheels $f$, $f$ which run upon the lower rails $c$, $c$.

The traveling wheels $e$ may be provided with a central flange which runs in the slot between the upper rails $b$, $b$ as shown in Fig. 2 or wheels having flanges on the outer sides, as shown in Fig. 4, can be made use of.

$g$ is the winding drum which is carried on a vertical spindle $h$ fixed in the frame $d$, the said drum having its winding surface made concave, in the same manner as the surface of a capstan head, so that the rope will always run at or about the center of the drum.

$i$ is the armature of an electric motor mounted upon the frame, the shaft $k$ of which has upon it, at its lower end, a pinion $l$ which engages with internal gear teeth on the drum $g$. This pinion $l$ is free to revolve on the shaft $k$ when in the position shown, clutch teeth upon its upper surface being provided to engage with corresponding clutch teeth upon or in connection with the shaft $k$. The movement of the said pinion to cause the engagement and disengagement of the clutch is effected through the medium of a rod $m$ which passes through the shaft $k$, which is made tubular, the said rod being secured to and rotating with the pinion $l$ and operated by a lever $n$. The rod $m$ is connected to the lever by a ball or other joint to allow the rotation of the rod. The shaft $k$ also carries a gear wheel $o$ which engages with a pinion $o^1$ on a shaft $p$, this latter shaft being provided with a worm $p^1$ which engages with a worm-wheel $q$ on the axle of one of the traveling wheels $e$, whereby the traveler may be caused to move along the elevated track.

The pinion $o^1$ is connected to its shaft by a feather and is adapted to be raised to move it out of engagement with the gear wheel $o$ by means of a lifting plate or fork $r$ connected by a rod $r^1$ to a lever $r^2$. The levers $n$ and $r^2$ are placed in a position in which they can be readily operated by the driver sitting upon a seat $s$ mounted upon the frame $d$.

$t, t$ are conductor rails which are arranged in the heads of the standards $a$ below the level of the rails $b, b$ the current being picked up from these conductor rails by brushes on a plow $u$ which projects through the slot between the rails $b$. $u^1$ indicates a controller of ordinary construction for controlling the current to the motor.

Figure 5:
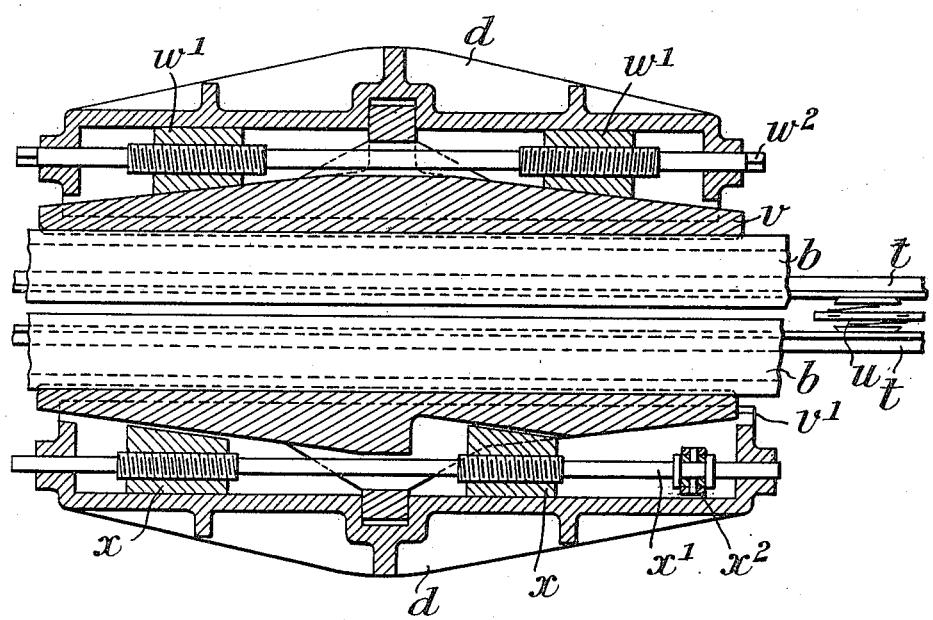
Fig. 5 is a sectional plan of the lower part of the traveler.
Figure 1:
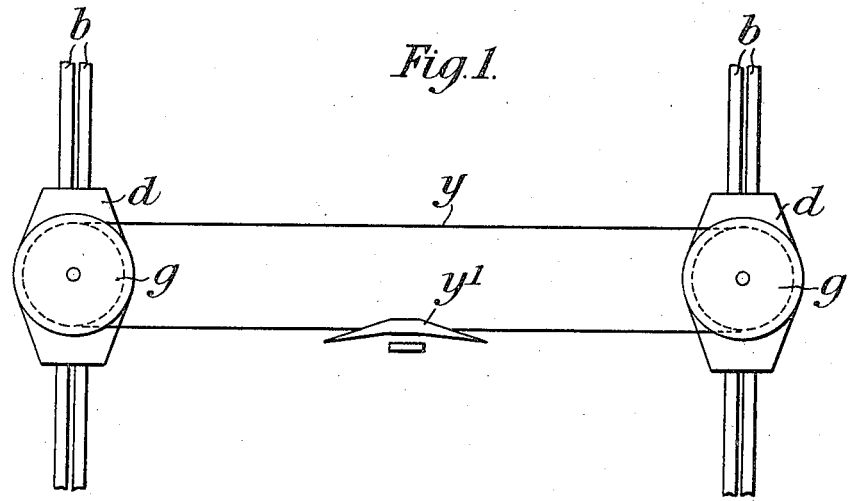
Figure 1 is a diagrammatic view illustrating the system.

Fig. 5 shows a brake which I advantageously apply in connection with the traveler and which serves to lock the latter upon the track rails during the hauling operation. This brake comprises two shoes $v$, $v^1$ the shoe $v$ being designed to be adjusted to its operative position by means of wedge blocks $w^1$ bearing upon the inclined outer surface of the shoe $v$ and adjusted by means of a screw $w^2$ having right and left hand screw-threads. The other shoe $v^1$, during the movement of the traveler, is slack so that it does not exert any gripping operation and it is designed to be pressed against the track by means of wedge blocks $x$, $x$ mounted on a rod $x^1$ moved longitudinally by a lever $x^2$ adjacent to the seat $s$ of the driver.

$v$ indicates the hauling rope and $y^1$ an implement, say, a two-way or balance plow, which is to be hauled.

In preparing the apparatus for use, the rope $y$ is connected at one end to the implement $y^1$ then passed two and a half times around the drum of one traveler, then conveyed to the other traveler and passed two and a half times around the drum of the same, and finally connected at the other end to the implement $y^1$. In order to provide for regulating the tension of the rope, by taking up the slack, a winding drum or winch or other means are provided upon the implement.

With this arrangement it will be understood that during the traverse of the implement the winding drums of both travelers will be in operation.

When the apparatus is not in use, the hauling rope can be wound or stored upon the drum $g$ of one of the travelers. The rope, when required for use, is unwound therefrom by temporarily using, say, a hempen rope upon the drum of the traveler upon which the hauling rope is not wound.

It is to be understood that the apparatus hereinbefore described is only given as an example of mechanism suitable for carrying out the invention and that any other suitable form of motor-propelled traveler provided with winding drums as described may be used for the purposes of my invention.

If desired, two implements may be operated at the same time, say, for instance, a plow and a harrow, the plow traveling in one direction and the harrow in the opposite direction.

It will be obvious that in very large areas, for instance, on prairie land, a number of tracks equi-distant from each other can be laid and that after the space between one pair of tracks has been cultivated the traveler on the track most distant from the uncultivated area may be transferred to the track on the far side of the next area to be cultivated. For this purpose it will be necessary to connect the extremities of the said tracks in such a manner that the transfer of the travelers can be effected.

A simple arrangement for this purpose comprises a transverse track connecting the several parallel tracks and provided at each point of junction with a turntable for allowing of the transfer in the desired manner. Such transverse track could also extend to a power house or a shed in which the travelers would be stored when not required for use.

The tracks and travelers hereinbefore described are not merely useful for actual cultivation but can be used also for cutting and harvesting the crops; in the latter case wagons may be placed upon the tracks, designed to be hauled along by the travelers to barns or store houses.

When the land provided with overhead tracks is to be drained and a suitable outfall is available the rail supports $a$, $a$ may be embedded in concrete and a main drain formed in concrete beneath the track, for instance, as illustrated at $z$ in Fig. 2, transverse holes $z^1$ being made therein which form the terminals of field or branch drains.

Claim:

An apparatus for land cultivation comprising two permanently fixed elevated rail tracks arranged parallel to one another, a motor carriage mounted on each of said tracks, a winding drum carried upon each of said motor carriages, and a single hauling rope around the drums of both carriages.

GEORGE FREDERICK COOKE.